United States Patent [19]

Carlson, Jr. et al.

[11] 4,378,296
[45] Mar. 29, 1983

[54] FLUX FILTER

[75] Inventors: Roy C. Carlson, Jr., Boxford Township, Essex County, Mass.; Edward J. March, Lower Makefield Township, Bucks County, Pa.

[73] Assignee: Western Electric Co., Inc., New York, N.Y.

[21] Appl. No.: 278,150

[22] Filed: Jun. 29, 1981

[51] Int. Cl.³ ............................................. B01D 17/02
[52] U.S. Cl. ................................... 210/774; 210/187
[58] Field of Search ................ 210/739, 774, 86, 106, 210/187, 175, 742, 744, 805, 775, 800; 165/61, 172, 181, DIG. 13; 62/532, 123, DIG. 13

[56] References Cited

U.S. PATENT DOCUMENTS

| Re. 30,399 | 9/1980 | Ammann et al. | 228/180 R |
| 872,257 | 11/1907 | Schicht | 62/123 |
| 4,077,467 | 3/1978 | Spigarelli | 165/105 |
| 4,244,505 | 1/1981 | Stokes et al. | 228/223 |

FOREIGN PATENT DOCUMENTS 500383  1/1951  Belgium ..................... 165/DIG. 13

Primary Examiner—Charles N. Hart
Assistant Examiner—Wanda L. Millard
Attorney, Agent, or Firm—D. J. Kirk

[57] ABSTRACT

A filter (21) for removing flux from a hot heat transfer liquid-flux mixture. The heat transfers liquid-flux mixture is directed into a chamber (41) having a plurality of spaced, hollow members (64—64) through which a coolant passes. Upon being cooled the flux deposits on the surface of the members (64—64). The liquid, with substantial portions of the flux removed therefrom, then leaves the filter (21).

3 Claims, 3 Drawing Figures

FLUX FILTER

TECHNICAL FIELD

The instant invention is related to a flux filter.

BACKGROUND OF THE INVENTION

In the prior art it is well known to solder, fuse or braze articles by condensing hot saturated vapor of a heat transfer liquid thereon. Typically such operations are performed in a chamber having a reservoir of the heat transfer liquid therein. Immersion heating coils in the reservoir are activated to boil the liquid while cooling coils mounted in the upper portion of the chamber are used to condense vapor from the boiling liquid. Such an arrangement forms a confined body of hot saturated vapor by substantially precluding the escape of the vapor from the chamber. The articles are then immersed in the body of vapor which condenses thereon and gives up its latent heat of vaporization thereto to heat the articles to the temperature required for soldering, brazing or fusing. Such a technique is described in U.S. Pat. No. Re. 30,399 which issued on Sept. 9, 1980 and is assigned to Western Electric Company and Bell Telephone Laboratories, Inc. and is incorporated by reference herein.

This technique has proven to be eminently successful, however, solder flux placed on the article to be soldered is washed therefrom by the liquid condensate and falls into the reservoir of the boiling heat transfer liquid. The flux and other contaminants coming in contact with the immersion heaters can cause "hot spots" on the heaters which can lead to thermal degradation of the heat transfer fluid. Also, the presence of large quantities of flux in the heat transfer fluid accelerates the formation of acid within the vapor environment which leaves undesirable ionic contamination on processed parts and shortens the useful life of the chamber. Additionally, the heat transfer liquid is expensive necessitating repeated reuse from an economic standpoint.

U.S. Pat. No. 4,077,467 describes a system for removing the flux from the heat transfer liquid. The mixture of the high temperature (e.g., 419° F.) liquid with the flux suspended therein is drained from a reservoir into a cooling chamber, the flux thereby becoming solidified in suspension. The suspended, solidified flux is then filtered out by a mechanical filter connected to the output line of the cooling chamber. The heat transfer liquid passing through the mechanical filter is then pumped back into the reservoir.

The mechanical filters are comprised of a housing having a replaceable fiber mesh cartridge therein. The fiber being one of a variety of yarns or synthetic materials depending on the constituents of the flux and/or the temperature of the liquid. Such mechanical filters have been found to quickly clog up and must be monitored often and cartridges changed at least daily depending upon the particular product being soldered and the amount of flux used.

Accordingly, there exists a need for a reuseable filter which is effective for removing flux from a liquid-flux mixture and which requires a minimum of maintenance and/or cleaning.

SUMMARY OF THE INVENTION

The foregoing problems have been overcome by the instant method of removing flux from a hot liquid flux mixture comprising the steps of directing the liquid-flux mixture into a container having a plurality of spaced, hollow members therein; and passing a coolant through the hollow members to lower the temperature of the mixture to precipitate out flux therein, the flux depositing on the surface of the members.

DETAILED DESCRIPTION

The instant solder flux filter is described in association with its use with a flux filtration system used to filter flux from a liquid-flux mixture generated during condensation soldering of articles. However, such description is for purposes of exposition and not for limitation for the instant filter may be used to filter flux or flux-like materials from a liquid in other systems such as vapor degreasers or the like.

The term flux or solder flux as used herein refers to that material applied to an article to be soldered to reduce the surface tension of the molten solder and remove oxides from the article in order to form a strong bond. In a particular embodiment a rosin flux, Alpha 100, manufactured by Alpha Metals Co., was used but the instant invention is not limited to filtering a specific flux. Any flux having materials therein which will adhere to a cool surface can be effectively filtered using the instant techniques.

In prior art rosin flux filtration systems associated with condensation soldering facilities, it is known to divert heat transfer liquid condensate and rosin flux which drips from the articles during the soldering process from a boiling reservoir of the liquid within the facility. The condensate liquid-flux mixture is cooled in a heat exchanger to precipitate out the flux then flows through one or more mechanical filters to remove the flux and the filtered condensate is fed back to the reservoir of the condensation soldering facility. The mechanical filters may be one of many well known filters comprising a container with a replaceable fiberglass or cotton mesh filter cartridge. Although such a system can work effectively, it necessitates the changing of the mechanical filter elements on at least a daily basis which is time consuming and expensive.

FLUX FILTRATION SYSTEM

Figure 1:
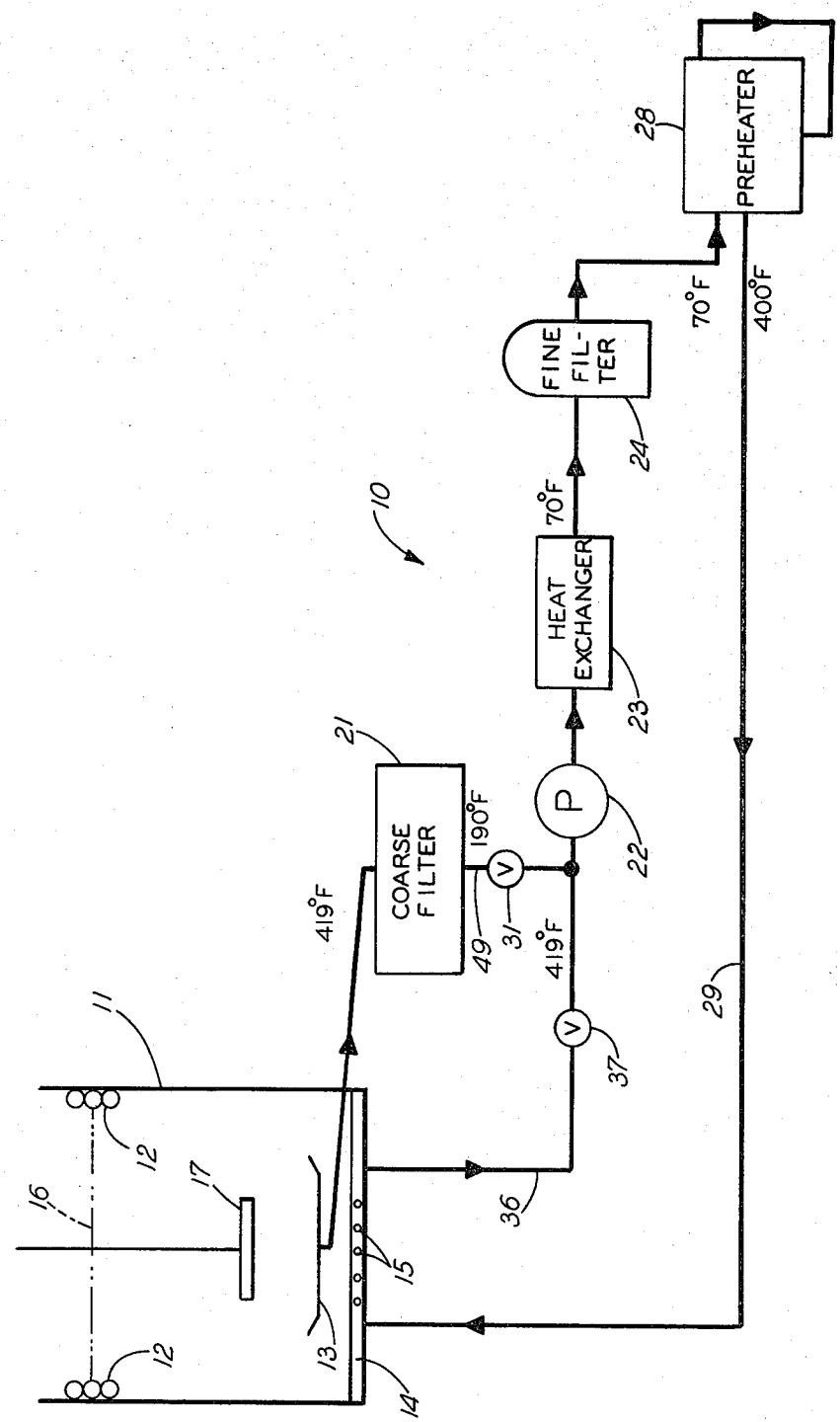
FIG. 1 depicts a flux filtration system which incorporates the instant filter.

FIG. 1 depicts a continuous rosin flux filtration system in which the instant filter is used. The system is generally designated by the numeral 10 and is described in detail in copending patent application Ser. No. 278,151, titled "Rosin Flux Filtration System" by E. J. March and G. M. Wenger, filed in the U.S. Patent and Trademark Office on even date herewith and which is incorporated herein be reference. A condensation soldering facility 11 shown schematically in FIG. 1 is described in detail in U.S. Pat. No. Re. 30,399 and is also incorporated herein by reference. The facility 11 has a cooling coil 12, a condensate drain pan 13 and a reservoir of primary heat transfer liquid 14 in the lower portion thereof with immersion heaters 15—15 therein.

In operation, the heaters 15—15 are activated to boil the heat transfer liquid 14 (e.g., Fluorinert FC-70) and form a body of hot (e.g., 419° F.) saturated vapor between a phantom line 16 through the cooling coil 12 and the surface of the heat transfer liquid. An article 17 having solder preforms, solder paste or the like and rosin flux thereon is immersed in the body of vapor which condenses on the solder and the article causing the solder to reflow. The article 17 is then removed from the facility 11 and the solder solidifies to bond portions of the article together. During the solder reflow process, condensed vapor (i.e., heat transfer liquid) as well as rosin flux will drip from the article 17 and fall into the drain pan 13. As hereinbefore indicated, rosin flux has been found to be deleterious to the condensation soldering process and the reuse of the expensive liquid an economic necessity. Thus, it is most desirable to filter out the flux from the primary heat transfer liquid 14.

The liquid-flux mixture falling from the article 17 passes through the tandem combination of a coarse filter 21, a pump 22, a water cooled heat exchanger 23, a fine mechanical filter 24, and a preheater 28 having an output 29 that discharges filtered primary heat transfer liquid 14 back into the reservoir of liquid in the facility 11.

The coarse filter 21 removes substantial portions of the rosin flux in the hot liquid-flux mixture. The coarse filter 21 has sufficient volume to accommodate approximately 4 to 6 sequential batch condensation soldering operations depending on the article 17 being processed. The coarse filter 21 will accumulate the mixture therein to a predetermined level. During the time that the mixture is being accumulated an output valve 31 is closed. After reaching the predetermined level, the valve 31 is opened and the liquid free of visible rosin flux is forwarded to the heat exchanger 23 by the pump 22 where the liquid is cooled to approximately 70° F. to precipitate out any rosin flux residue that remains in solution with the warm heat transfer liquid. The liquid with precipitate therein is then discharged into the fine mechanical filter 24 which will remove substantially all of the remaining particulate rosin flux residue and dirt therefrom as hereinbefore described.

The filtered heat transfer liquid 14 leaving the fine mechanical filter 24 is at a temperature of about 70° F. The liquid 14 cannot be directly fed back into the facility 11 for the mixing with the liquid 14 therein, at 419° F., would result in turbulence and rapid lowering of the temperature of the mixture. Such turbulence and lowering of the temperature can alter the level of the vapor-air interface and possibly cause the body of vapor to collapse. Accordingly, the heat transfer liquid 14 is directed into the preheater 28 where the liquid temperature is raised to approximately 400° F. prior to being fed back into the reservoir of liquid in the facility 11 via output line 29. The preheater 28 is described in copending patent application Ser. No. 278,152 titled "A Technique for Elevating the Temperature of a Fluid" by R. C. Carlson and E. J. March, filed in the U.S. Patent and Trademark Office on even data herewith.

Additionally, a conduit 36 carrying the heat transfer liquid 14, having relatively low amounts of flux contamination, communicates between the bottom of the facility 11 and the input of the pump 22 via valve 37. In operation, valve 37 is open while the valve 31 is closed (that is while the filter 21 is being filled or for extended periods between batch soldering apparatus) and the valve 37 is closed while the valve 31 is open. Accordingly, the heat transfer liquid 14 will continuously be flowing through the system 10 purging and filtering any rosin flux which may have passed through the coarse and fine filters 21 and 24, respectively, and deposited within the lines and components of the system.

COARSE FILTER

Figure 2:
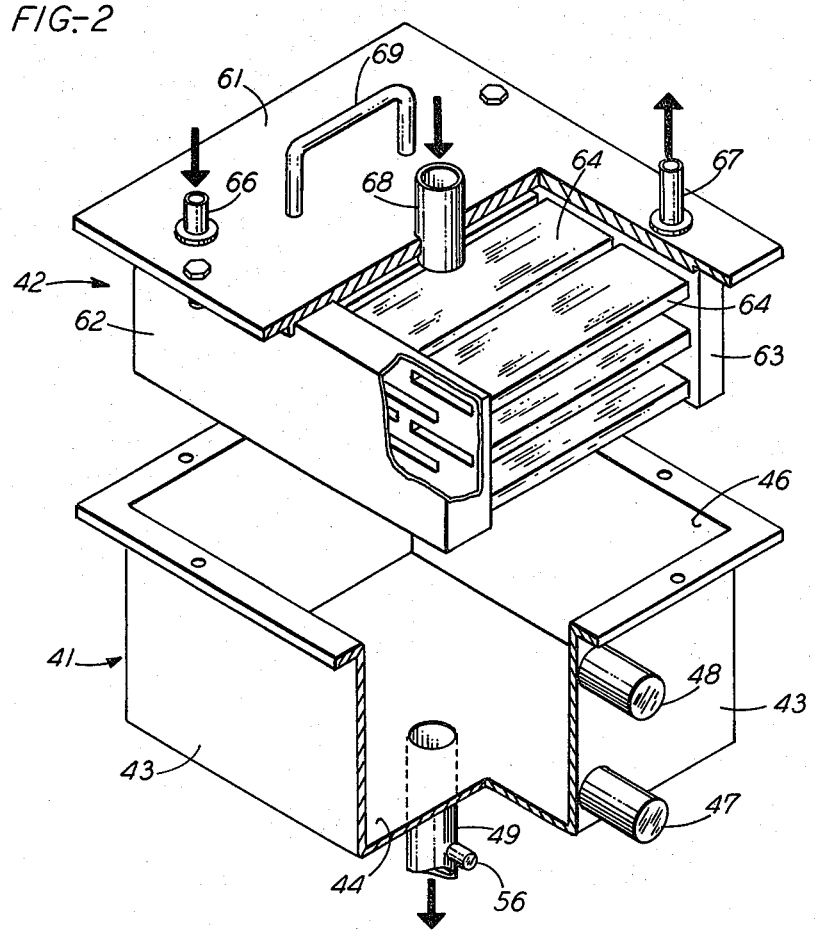
FIG. 2 is a partial cross-sectional isometric view of the coarse filter which embodies the instant inventive techniques.

The instant coarse flux filter 21, shown in an exploded isometric view in FIG. 2, is comprised of a container 41 and a removable cooling chamber 42. The container 41 has a plurality of sidewalls 43—43 and a bottom 44 and has an opening 46 at the top. First and second liquid level sensors 47 and 48, respectively, are located in one of the sidewalls 43. An output conduit 49, having a temperature sensor 56 mounted therein, extends from the bottom 44 of the container 41.

Figure 3:
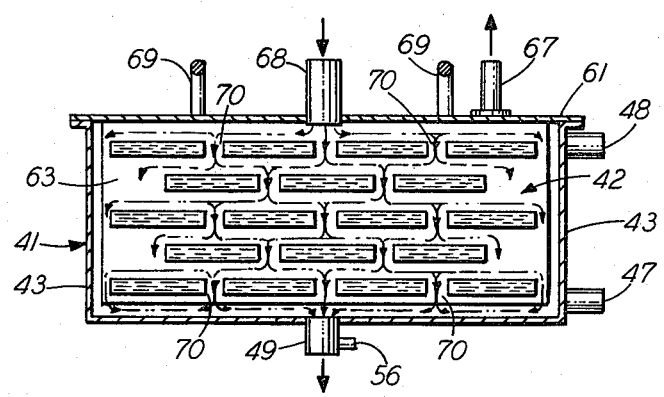
FIG. 3 is a cross-sectional view of the instant filter depicting the flow of heat transfer therethrough.

The chamber 42 is comprised of a top plate 61, first and second headers 62 and 63 fixedly mounted thereto. A plurality of spaced, hollow channel members 64—64 communicate between the first and second headers 62 and 63. The channel members 64—64 are mounted in a staggered fashion as can best be seen in the cross-sectional view of FIG. 3. A coolant input line 66 connects to the first header 62 while a coolant output line 67 connects to the second header 63. A flux-liquid input conduit 68 is centrally located in the top plate 61. A pair of handles 69—69 fixedly fastened on the top plate 61 are provided to facilitate removal and insertion of the chamber 42 into the container 41 for replacement, repair or cleaning.

In operation of an exemplary embodiment, chilled water (e.g., 60° F.) continuously passes through the coolant input line 66 into the first header 62, through the channel members 64—64, into the second header 63 and out the line 67. The heat transfer liquid-flux mixture passes through the input conduit 68 after each batch soldering operation. The hot (e.g., 419° F.) liquid-flux mixture passes over the surfaces of the channel members 64—64 and through interstices 70—70. As the liquid-flux mixture cools rosin flux precipitates out and attaches to the cool surfaces of the members 64—64. At this time the output valve 31 is closed, the valve 37 is open and the liquid-flux mixture accumulates in the filter 21 until the level reaches the second sensor 48 (approximately 4.5 minutes). This residence time within the coarse filter 21 is sufficient to ensure proper cooling of the liquid-flux mixture to effectively remove flux therefrom. When the liquid-flux mixture reaches the second level sensor 48 it generates a signal over leads (not shown) to open the valve 31 and close the valve 37 to release the coarsely filtered liquid through the conduit 49. Once the level of the filtered liquid falls below the first level sensor 47 it generates a signal over leads (not shown) to close valve 31 and open valve 37 to accumulate the liquid-flux mixture and repeat the foregoing filtering steps.

Additionally, as the rosin flux continues to deposit out on the members 64—64, it acts as an insulator reducing the heat transfer effectiveness of the members. As a result the temperature of the exiting heat transfer liquid exiting via the conduit 49 will increase over a period of time (e.g., approximately one week depending on the product soldered and the amount of flux used). The temperature sensor 56 in the conduit 49 continuously monitors the filtered material and when the liquid temperature attains a predetermined value an indicator light (not shown) will become illuminated under control of the temperature sensor to direct an operator to remove and clean or replace the cooling chamber 42. This eliminates the need for a visual inspection of the members 64—64 by the operator which is time consuming and difficult due to the staggered arrangement of the members.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of removing solder flux from a liquid-flux mixture, the method comprising the steps of:
    directing the liquid-flux mixture into a chamber having a plurality of spaced, substantially planar, hollow members arranged in a plurality of staggered, parallel rows within the chamber, said mixture being directed into said chamber in a direction normal to the planar, hollow members;
    passing a coolant through the hollow members to lower the temperature of the mixture to increase the viscosity of the flux to cause said flux to deposit on said planar hollow members;
    accumulating a predetermined amount of the directed liquid-flux mixture within the chamber; and
    discharging the liquid from the chamber after a predetermined period of time.

2. An apparatus for removing solder flux from a liquid-flux mixture, the apparatus comprising:
    a chamber adapted to accumulate the liquid-flux mixture;
    a plurality of spaced, substantially planar, hollow, members arranged in a plurality of staggered, parallel rows mounted within the chamber, through which a coolant flows to lower the temperature of the mixture to increase the viscosity of the flux to cause said flux to deposit on said planar hollow members;
    an input located in the chamber, above the substantially planar hollow members, through which the liquid-flux mixture is directed into the chamber in a direction normal to the planar hollow members; and
    an output located in the chamber below the substantially planar hollow members, through which the liquid is discharged from the chamber after a predetermined period of time.

3. The apparatus as set forth in claim 2, wherein the chamber is further comprised of:
    a removable coverplate;
    first and second plenums fixedly mounted to and depending from the coverplate;
    the substantially planar, hollow members extend between said first and second plenums; and
    an input line and output line passing through the coverplate and communicating with the first and second plenums, respectively, to flow coolant through the plenums and the hollow members.

* * * * *